Jan. 25, 1955  L. W. GEORGES  2,700,406
REINFORCED RUBBER ARTICLE AND METHOD OF MAKING SAME
Filed Sept. 20, 1951
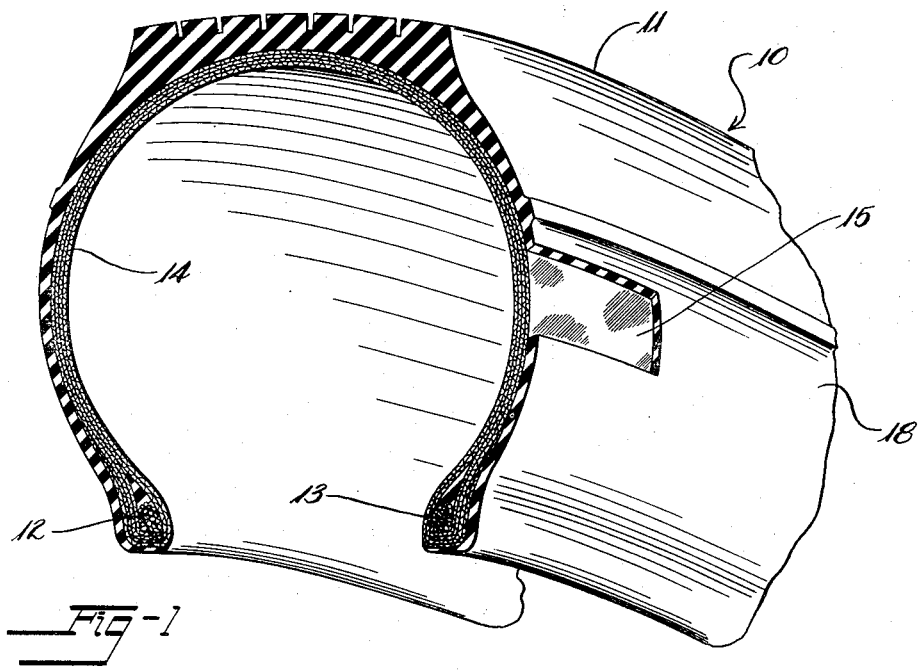
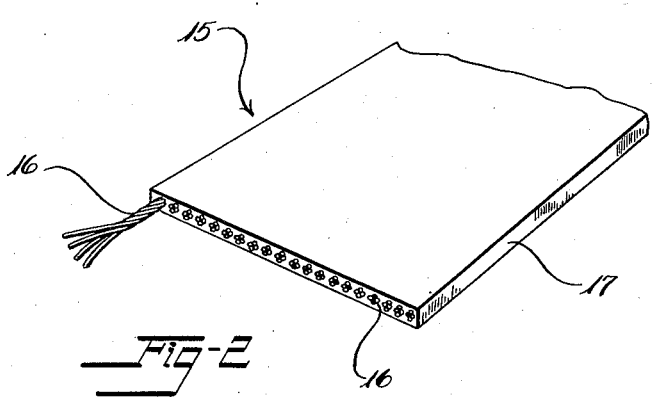
INVENTOR.
Louis W. Georges
BY
Ely & Frye
Attys.

United States Patent Office 2,700,406
Patented Jan. 25, 1955

2,700,406

REINFORCED RUBBER ARTICLE AND METHOD OF MAKING SAME

Louis W. Georges, Akron, Ohio, assignor to The Firestone Tire & Rubber Company, Akron, Ohio, a corporation of Ohio Application September 20, 1951, Serial No. 247,473

15 Claims. (Cl. 152—359)

This invention relates to rubber articles and more particularly to composite rubber articles reinforced by fibrous materials such as filaments, fibers, cords, fabrics and the like.

Rubber articles such as tires, hose, belting, footwear, etc. have for many years depended upon textiles of various kinds for strength and reinforcement. A difficult problem attending the use of textiles in rubber articles has been a tendency of the textile to deteriorate when such articles are subjected to elevated temperatures for extended periods of time. Normal use of many of these articles is accompanied by an elevation of temperature either from a heat build-up within the article itself as is the case with automobile tires and belting, or from exposure to external (or internal) heat as may be the case with various hose and other fiber-reinforced rubber articles. Upon deterioration of the textile, the textile tends to break and the rubber article to fail.

It is, therefore, an object of the invention to provide composite rubber articles containing reinforcing textiles which are resistant to deleterious effects when subjected to elevated temperatures. Another object is to provide improved rubber articles reinforced by textile fibers. A still further object is to provide a pneumatic tire having a body member made up of plies of rubber containing textile fibers which are resistant to heat-aging. Another object is to produce a pneumatic tire having improved properties.

These and further objects are obtained in accordance with the invention by treating a textile fiber with ammonium or metal dicyanimides and thereafter embedding the fiber in rubber. The textile fibers may advantageously be treated with the dicyanimide in dissolved or suspended form in any suitable manner such as by dipping, brushing, spraying and the like to impregnate the fibers with the dicyanimide. A more complete understanding of the invention may be had by reference to the illustrative specific examples which follow.

Three aqueous solutions of sodium dicyanimide were prepared having dicyanimide concentrations of 1%, 3% and 5% respectively. Approximately 100 yd. lengths of 1650/2 rayon tire cord (cord consisting of two plies of 1650 denier rayon yarn twisted together) were treated by dipping with the above solutions and drying. For purposes of simplicity, the length of cord treated with the 1% solution will hereafter be designated cord A; the length of cord treated with the 3% solution will be designated cord B; and the length of cord treated with the 5% solution will be designated cord C. A length of untreated rayon tire cord, hereafter designated cord D, was provided as a control. The amount of dicyanimide absorbed by the treated cords was determined and is reported hereafter as "pickup" in percent by weight on the weight of the untreated cord. The pickup of cord A was 0.9; the pickup of cord B was 2.3; and the pickup of cord C was 4.0.

EXAMPLE 1

*Effect of heat aging on tire cord*

In order to determine the effect of heat aging, samples of cords A, B, C and D were tested for breaking strength before aging, after aging for 6 hours at 150° C. in a sealed glass tube and after aging for 12 hours at 150° C. in a sealed glass tube. All breaking strength tests were carried out on a Model X–3 Scott Tester and are reported in pounds. The results of these tests are shown in Table I as follows:

TABLE I

| Sample No. | Percent Pickup of NaN(CN)₂ | Breaking Strength in Lbs. | | | | |
|---|---|---|---|---|---|---|
| | | Unaged | Aged 6 Hrs. | Rating | Aged 12 Hrs. | Rating |
| Control | | 25.7 | 13.8 | 100 | 10.1 | 100 |
| 1 | 0.9 | 25.1 | 21.7 | 157 | 20.8 | 206 |
| 2 | 2.3 | 24.7 | 22.2 | 161 | 22.5 | 222 |
| 3 | 4.0 | 24.8 | 22.1 | 160 | 22.1 | 218 |

From the data shown in Table I, it is seen that untreated cord lost 46% of its strength after aging for six hours and 61% of its strength after aging for twelve hours. Cord treated in accordance with the invention, on the other hand, showed remarkable resistance to the effects of heat-aging; the cord of sample 1 lost only 17% of its strength after aging twelve hours; the cord of sample 2 lost only 9% of its strength after twelve hours; and the cord of sample 3 lost 11% of its strength after twelve hours.

EXAMPLE 2

*Effect of abrasion on tire cord*

Additional portions of cords A, B and D were tested in order to determine ability of treated and untreated cords to resist abrasion. In these tests in each instance the two strands of a sample of cord were separated from each other. One of the strands was then abraded against the other strand by a reciprocating motion while the strands were maintained under a constant tension. The number of cycles required to cause failure of one or both of the strands was observed and is reported in Table II which follows:

TABLE II

| Sample No. | Percent Pickup of NaN(CN)₂ | Cycles of Abrasion to failure |
|---|---|---|
| Control | | 20,200 |
| 4 | 0.9 | 32,600 |
| 5 | 2.3 | 23,000 |

From the data of Table II it is apparent not only that treatment with a dicyanimide in accordance with the invention does not impair the abrasion resistance of cord treated therewith but in fact cords treated in accordance with the invention possessed improved resistance to abrasion.

EXAMPLE 3

*Adhesion of tire cord to rubber*

A particularly troublesome problem in rayon tire cord is that of adhering the cord to rubber. Therefore, tests were made to determine if treating of rayon tire cord in accordance with the invention affected rubber-cord adhesion. Additional samples of cords A, B and D were immersed in a protein-latex adhesive dip, dried, adhered to rubber test strips, tested for static adhesion in accordance with the procedure set out in "Study of the 'H' Test for Evaluating the Adhesive Properties of Tire Cord in Natural and GR–S Rubbers," Ind. Rub. World, 114, p. 213 (1946); and tested for dynamic adhesion in accordance with the procedure set out in W. J. Lyons "Method for Evaluating the Dynamic Fatigue of Adhesion of Tire Cords to Rubber Stocks," Anal. Chem. (in press 1951). Both the static adhesive force and the dynamic adhesive force were determined on a Model X–3 Scott Tester. The results of these tests are reported in Table III as pounds required to pull out cord from one inch of rubber.

TABLE III

| Sample No. | NaN(CN)$_2$ Percent Pickup | Adhesion | |
|---|---|---|---|
| | | Static, lbs./in. | Dynamic, lbs./in. |
| Control | | 36 | 31.8 |
| 6 | 0.9 | 43.5 | 38.7 |
| 7 | 2.3 | 52.6 | 37.9 |

It is seen from the data of Table III that the practice of the invention does not impair the adhesion of rayon tire cord to rubber but to the contrary substantially improves the adhesion.

EXAMPLE 4

*Effect of flexure on cord embedded in rubber*

Two identical test straps were formed by, in each instance, coating samples of cord B, with a protein-latex adhesive dip, drying and curing the cords between two strips of rubber to form a vulcanized rubber strap having cord embedded therein. One of the two straps was subjected to rapid cyclic flexure for ten hours. The other strap was not flexed. The two straps were then treated with a rubber solvent or swelling agent and the cords removed from the rubber. The breaking strengths of these cords were then determined on a Model X–3 Scott Tester and appear as data for sample 8 in Table IV below.

Two straps each from cords C and D were made up and tested in an identical manner as used in the case of sample 8. The data for these tests appear in Table IV respectively as data for sample 9 and as data for the Control.

TABLE IV

| Sample No. | Percent Pickup NaN(CN)$_2$ | Breaking Load | | Rating |
|---|---|---|---|---|
| | | Unflexed, lbs. | Flexed, lbs. | |
| Control | | 21.9 | 10.0 | 100 |
| 8 | 2.3 | 22.7 | 11.9 | 109 |
| 9 | 4.0 | 23.4 | 12.3 | 113 |

It is seen by reference to the data set out in Table IV that treating cord with a dicyanimide and embedding the cord in rubber in accordance with the invention does not have a deleterious effect on the retention of strength after flexure of the resulting rubber article. The retention of strength after flexure of treated cords actually was in each case somewhat better than the retention of strength after flexure of an untreated control.

EXAMPLE 5

*Other dicyanimides and heat aging*

Another length of rayon tire cord was divided into three portions. One portion of the tire cord was dipped with a 6% aqueous solution of ammonium dicyanimide and thereafter dried. Another portion of the tire cord was dipped with a 6% aqueous dispersion of zinc dicyanimide and thereafter dried. The third portion of tire cord was maintained as an untreated control. Each of these cords (treated and untreated) was then sealed in a glass tube and heated at 150° C. for 6 hours. Breaking strengths were determined before and after aging as in Example 1 and are reported below in Table V.

TABLE V

| | Percent Pickup | Breaking Strength in Pounds | | Rating |
|---|---|---|---|---|
| | | Unaged | Aged 6 hours | |
| Control | | 24.5 | 10.3 | 100 |
| NH$_4$N(CN)$_2$ | 3.3 | 24.8 | 20.2 | 187 |
| Zn[N(CN)$_2$]$_2$ | (*) | 23.0 | 17.8 | 175 |

*Not determined.

The data of Table V show ammonium and zinc dicyanimide also to be active inhibitors of deleterious heat aging effects on tire cord.

EXAMPLE 6

*Effect of abrasion on unaged and aged tire cord*

Another length of rayon tire cord was treated by immersing it in a 3% aqueous solution of sodium dicyanimide and then drying the cord. For convenience this cord will be referred to hereafter as cord E. The pickup of cord E in percent sodium dicyanimide on the weight of untreated cord was 2.6. An untreated rayon tire cord (cord F) was maintained as a control.

Portions of cords E and F were subjected to varying degrees of heat aging in sealed glass tubes at 150° C. The resistance to abrasion of the variously aged cords was determined in the same manner used in obtaining the data for Table II. The resulting data appears in Table VI below, the data from cord E being reported as sample 10 and the data from cord F being reported as Control.

TABLE VI

| Sample No. | Percent Pickup of NaN(CN)$_2$ | Abrasion in Cycles to Break | | | |
|---|---|---|---|---|---|
| | | Unaged | Heat Aged at 150° C. | | |
| | | | 3 hrs. | 6 hrs. | 12 hrs. |
| Control | | 22,100 | 7,100 | 600 | *0 |
| 10 | 2.6 | 19,200 | 18,000 | 22,800 | 16,000 |

*Broke before first cycle.

It is apparent from the results shown in Table VI that the effect of treatment with dicyanimide upon the abrasion resistance of cord subjected to heat aging is a remarkable improvement.

EXAMPLE 7

*Effect of flexure on unaged and aged tire cord embedded in rubber*

Additional portions of unaged cords E and F were formed into two rubber test straps from each of the cords E and F in the same manner used to produce the straps for Example 6 above. Still other portions of cords E and F were heat aged in sealed glass tubes for six hours at 150° C. The heat aged cords were then formed into two rubber test straps from each of cords E and F. One of each of the two test straps containing unaged cord was subjected to rapid cyclic flexure for 10 hours; the other test straps containing unaged cord were not flexed. Similarly, one of each of the straps containing heat aged cord was subjected to flexure and the remaining straps were not flexed. All of the test straps were then treated with a rubber solvent; the cords were separated from the rubber and tested on a Model X–3 Scott Tester to determine their breaking strengths. The data originating from cord E appears in Table VII as data for sample 11. The data originating from cord F appears in the table as data for Control.

TABLE VII

| Sample No. | Percent Pickup NaN(CN)$_2$ | Breaking Load | | | |
|---|---|---|---|---|---|
| | | Unaged | | Aged | |
| | | Unflexed, lbs. | Flexed, lbs. | Unflexed, lbs. | Flexed, lbs. |
| Control | | 21.4 | 16.1 | 10.5 | (*) |
| 11 | 2.6 | 22.2 | 17.0 | 23.5 | 15.8 |

*Cords broke in rubber strap within 2 hours after flexing started.

The results shown in Table VII show remarkable improvement in the retention of strength of aged tire cords which have been flexed while embedded in rubber in accordance with the invention.

EXAMPLE 8

Effects of heat aging on cotton tire cord

As a further showing of the valuable improvement of the heat aging properties of textile fibers, two identical samples of a commercial cotton tire cord were obtained. One sample was not treated and was used as a control. The other sample was dipped in a 3% solution of sodium dicyanimide, dried and the pickup determined (2.1%). Breaking strengths were obtained on the untreated control and on the treated cord both before aging and after aging for 12 hours in a sealed glass tube at 150° C. The results of these tests were as follows:

TABLE VIII

| Sample No. | NaN(CN)$_2$ Percent of Pickup | Breaking Strength in Pounds | | Rating |
|---|---|---|---|---|
| | | Unaged | Aged | |
| Control | | 15.1 | 8.4 | 100 |
| 12 | 2.1 | 15.3 | 13.4 | 157 |

EXAMPLE 9

Effects of heat aging on nylon tire cord

Three samples of commercial nylon tire cord were obtained and treated as follows: One sample was treated with a 3% aqueous solution of sodium dicyanimide; another sample was treated with a 5% aqueous solution of sodium dicyanimide and the third sample was maintained as an untreated control. The pickups of the three samples were respectively 0.6%, 1.1% and zero. As in the case of the cotton and rayon cord above, breaking strengths were obtained on these samples both before and after aging. The results are shown in Table IX below.

TABLE IX

| Sample No. | Percent Pickup NaN(CN)$_2$ | Breaking Strength in Pounds | | Rating |
|---|---|---|---|---|
| | | Unaged | After aging 6 hrs. at 150° C. | |
| Control | | 26.5 | 8.9 | 100 |
| 13 | 0.6 | 25.4 | 16.2 | 190 |
| 14 | 1.1 | 25.7 | 18.5 | 211 |

In addition to the dicyanimides set out in the above specific examples other dicyanimides are also effective in improving the properties of textile fibers. Notable among these are the other alkali metal dicyanimides, as well as the dicyanimides of cadmium, aluminum, magnesium, calcium, strontium and barium. The desirable results of the invention require the incorporation of only relatively minor proportions of the dicyanimides into the textile fiber. The incorporation of as little as 0.25% by weight of the dicyanimide based on the weight of the textile fiber produces noticeable improvement. If desired, as much as 10% of the dicyanimide may be incorporated into the fiber.

Articles of the invention are illustrated by the accompanying drawings in which:

Fig. 1 is a perspective view of a section of a textile fiber-reinforced pneumatic rubber tire, partly broken away, embodying the invention.

Fig. 2 is an enlarged diagrammatic view in perspective of a section of a ply of rubberized cord fabric from the body of the tire in Fig. 1 showing a cord projecting therefrom.

Referring to the drawings, a pneumatic tire 10 is shown having the usual tread member 11, inextensible beads 12 and 13, sidewalls 18 and a body member 14. The body member 14 is made up of a plurality of plies of tire cord fabric 15, 15, each of which consists of a plurality of parallel tire cords 16, 16 embedded in rubber 17. The individual cords 16 may consist of any desired number of plies of suitable textile yarns or fibers twisted together in any suitable manner.

Prior to embedding the individual textile fiber tire cords 16, 16 in rubber 17 (which may be accomplished in any of the manners commonly utilized in the production of rubberized cord fabric), a relatively minor proportion of an ammonium or metal dicyanimide is incorporated into the cords 16, 16 in accordance with the details set out in the examples and description above. The assembly of tire 10 from the special cord fabric 15 and the other members conventional in a pneumatic tire is carried out and the tire is vulcanized in any manner conventional in the tire building art.

A tire produced in accordance with and embodying the invention represents an outstanding improvement over other tires presently in commercial use not only because of its ability to withstand longer periods of use under the elevated temperatures inherent in the operating conditions common in vehicular transportation, but also because of improved textile-rubber adhesion, improved resistance of tire cord to abrasion and less deterioration of the cord under flexing conditions.

It should be noted that the invention is not intended to be limited only to pneumatic tires but is equally meritorious wherever a fibrous material is utilized for reinforcing composite rubber articles. Notable among other composite rubber articles desirably embodying the invention are the various beltings such as power transmission belts and conveyor belts, steam hose, etc.

It should also be understood that the rubber portions of composite articles in accordance with the invention may be either natural rubber or they may be partially or wholly composed of the so-called synthetic rubbers such as GR-S (rubbery copolymer of butadiene and styrene), GR-I (rubbery copolymers of isobutylene and isoprene), GR-M (polychloroprene), GR-A (rubbery copolymer of butadiene and acrylonitrile) and the like. Additionally, the rubber portions of such composite articles may comprise mixtures of any or all of the above rubbers.

What I claim is:

1. A pneumatic tire including a tread member, inextensible beads and a body member, said body member comprising a plurality of plies of rubberized tire cord fabric, the cords of said fabric being organic and containing a relatively minor proportion of sodium dicyanimide.

2. A pneumatic tire including a tread member, inextensible beads and a body member, said body member comprising a plurality of plies of rubberized tire cord fabric, the cords of said fabric being organic and containing at least 0.25% by weight, based on the weight of the cord, of a member selected from a group consisting of ammonium, alkali metal, magnesium, calcium, strontium, barium, aluminum, cadmium and zinc salts of dicyanimide.

3. A pneumatic tire including a tread member, inextensible beads and a body member, said body member comprising a plurality of plies of rubberized tire cord fabric, the cords of said fabric being organic and containing a relatively minor proportion of ammonium dicyanimide.

4. A pneumatic tire including a tread member, inextensible beads and a body member, said body member comprising a plurality of plies of rubberized tire cord fabric, the cords of said fabric being organic and containing a relatively minor proportion of zinc dicyanimide.

5. A method of producing improved rubber articles reinforced by textile fibers which comprises impregnating an organic textile fiber with a member selected from the group consisting of ammonium, alkali metal, magnesium, calcium, strontium, barium, aluminum, cadmium and zinc salts of dicyanimide, embedding the impregnated fiber in vulcanizable rubber and vulcanizing the resulting article.

6. A vulcanized rubber article reinforced by organic textile fibers, said textile fibers containing at least 0.25 percent by weight, based on the weight of fiber, of a member selected from the group consisting of ammonium, alkali metal, magnesium, calcium, strontium, barium, aluminum, cadmium and zinc salts of dicyanimide.

7. A pneumatic tire including a tread member, inextensible beads and a body member, said body member comprising a plurality of plies of rubberized tire cord fabric, the cords of said fabric being organic and containing a relatively minor proportion of an alkali metal dicyanimide.

8. A method of producing rubberized tire cord fabric comprising the steps of treating an organic tire cord with a member selected from the group consisting of ammonium, alkali metal, magnesium, calcium, strontium, barium, aluminum, cadmium and zinc salts of dicyanimide and thereafter embedding the treated cords in rubber.

9. A rubber article reinforced by organic textile fibers, said textile fibers containing a relatively minor proportion of an alkali metal salt of dicyanimide.

10. A method of producing a rubber article which comprises treating organic textile fibers with an aqueous solution of an alkali metal dicyanimide, drying the treated fibers and thereafter embedding said treated fibers in rubber.

11. A pneumatic tire including a tread member, inextensible beads and a body member, said body member comprising a plurality of plies of rubberized tire cord fabric, the cords of said fabric being organic and containing at least 0.25% by weight, based on the weight of the cord, of sodium dicyanimide.

12. A pneumatic tire including a tread member, inextensible beads and a body member, said body member comprising a plurality of plies of rubberized tire cord fabric, the cords of said fabric being organic and containing at least 0.25% by weight, based on the weight of the cord, of ammonium dicyanimide.

13. A pneumatic tire including a tread member, inextensible beads and a body member, said body member comprising a plurality of plies of rubberized tire cord fabric, the cords of said fabric being organic and containing at least 0.25% by weight, based on the weight of the cord, of an alkali metal dicyanimide.

14. A pneumatic tire including a tread member, inextensible beads and a body member, said body member comprising a plurality of plies of rubberized tire cord fabric, the cords of said fabric being organic and containing at least 0.25% by weight, based on the weight of the cord, of zinc dicyanimide.

15. A rubber article reinforced by organic textile fibers, said textile fibers containing a relatively minor proportion of a member selected from the group consisting of ammonium, alkali metal, magnesium, calcium, strontium, barium, aluminum, cadmium and zinc salts of dicyanimide.

References Cited in the file of this patent

UNITED STATES PATENTS

| | | |
|---|---|---|
| 2,211,945 | Charch | Aug. 20, 1940 |
| 2,211,949 | Hershberger | Aug. 20, 1940 |
| 2,357,261 | Kaiser | Aug. 29, 1944 |
| 2,418,476 | Nagy | Apr. 8, 1947 |
| 2,436,980 | Standley | Mar. 2, 1948 |
| 2,439,369 | Nicol | Apr. 6, 1948 |
| 2,520,103 | Loukomsky et al. | Aug. 22, 1950 |
| 2,562,869 | Nagy | July 31, 1951 |

OTHER REFERENCES

American Dyestuff Reporter, Jan. 12, 1948; pages 11–15, "The Effect of Urea on Cellulosic Fibers."